United States Patent
Balabhadrapatruni et al.

(10) Patent No.: US 10,497,398 B2
(45) Date of Patent: Dec. 3, 2019

(54) CHOREOGRAPHIC EDITING OF MULTIMEDIA AND OTHER STREAMS

(71) Applicant: International Business Machines Corporation, Armonk, NY (US)

(72) Inventors: Venkatuday M. Balabhadrapatruni, Santa Clara, CA (US); Scott B. Greer, Essex Junction, VT (US); Rosalind T. A. Radcliffe, Durham, NC (US); John A. Riendeau, Madison, WI (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 15/092,785

(22) Filed: Apr. 7, 2016

(65) Prior Publication Data
US 2017/0294208 A1    Oct. 12, 2017

(51) Int. Cl.
*G11B 27/031* (2006.01)
*G11B 27/34* (2006.01)
*G11B 27/10* (2006.01)

(52) U.S. Cl.
CPC ........... *G11B 27/031* (2013.01); *G11B 27/10* (2013.01); *G11B 27/34* (2013.01)

(58) Field of Classification Search
CPC ........... H04N 5/23293; G06K 9/00744; G06F 3/0482; G11B 27/34; G11B 27/031
USPC .......... 386/233, 278–290, 240; 725/102, 88; 715/719–726; 726/26–33; 380/201
See application file for complete search history.

(56) References Cited

U.S. PATENT DOCUMENTS

| | | | | |
|---|---|---|---|---|
| 7,512,886 B1 * | 3/2009 | Herberger | ............ | G11B 27/034 715/723 |
| 7,676,142 B1 | 3/2010 | Chao | | |
| 2008/0092168 A1 * | 4/2008 | Logan | ............... | G06F 17/30265 725/44 |
| 2009/0133130 A1 * | 5/2009 | Kovalick | ............... | G06F 21/10 726/28 |
| 2009/0327893 A1 | 12/2009 | Terry | | |
| 2010/0080384 A1 * | 4/2010 | Lee | ................... | G06F 17/30265 380/200 |

(Continued)

FOREIGN PATENT DOCUMENTS

JP        2007110566 A      4/2007

OTHER PUBLICATIONS

Larry Jordan—Edit Smarter, "FCP X: Multicam," Aug. 19, 2012, 20 Pages, Thomson Reuters. https://larryjordan.com/articles/fcpx-multicam/.

(Continued)

*Primary Examiner* — Thai Q Tran
*Assistant Examiner* — Stephen R Smith
(74) *Attorney, Agent, or Firm* — Cantor Colburn LLP; Teddi Maranzano (57) ABSTRACT

Embodiments are directed to a computer implemented method of choreographic editing of multimedia and other streams. The method includes receiving, one or more multimedia clips. The multimedia clips are displayed to a user, who can then select one or more of the clips. The user creates one or more synchronization points. An embodiment automatically adjusts the selected multimedia clips using the synchronization points. Thereafter a finished media file is created.

20 Claims, 6 Drawing Sheets

(56) References Cited

U.S. PATENT DOCUMENTS

| | | | | |
|---|---|---|---|---|
| 2012/0198317 A1* | 8/2012 | Eppolito | .............. | G11B 27/034 715/202 |
| 2014/0096002 A1* | 4/2014 | Dey | ...................... | G06F 3/0488 715/723 |
| 2015/0302894 A1* | 10/2015 | Boiman | ............... | G11B 27/031 386/285 |
| 2016/0035392 A1* | 2/2016 | Taylor | .................... | G11B 27/34 386/241 |
| 2016/0124596 A1* | 5/2016 | Doerring | .............. | G06F 3/0484 715/723 |
| 2016/0133295 A1* | 5/2016 | Boyle | ................ | G06K 9/00744 386/240 |
| 2017/0134810 A1* | 5/2017 | Kashyap | ............ | H04N 21/4788 |

OTHER PUBLICATIONS

URUSoft, "The Subtitle Workshop Manual," Subtitle Workshop version: 2.51, Apr. 2001, 39 Pages, Thomson Reuters. http://web.letras.up.pt/egalvao/The%20Subtitle%20Workshop%20Manual.htm.

* cited by examiner

CHOREOGRAPHIC EDITING OF MULTIMEDIA AND OTHER STREAMS

BACKGROUND

The present disclosure relates in general to the field of computing. More specifically, the present disclosure relates to systems and methodologies for the editing of multimedia and other streams.

There is an increased desire for users to create and share multimedia content. The popularity of video sharing sites such as Youtube™, Vimeo™, and the like allows videos created by users to be shared all over the world. This is similarly true in the world of audio sharing sites, such as Soundcloud™, Spotify™, and the like, as well as the ability to share audio via video sharing sites—the result is that multimedia in the form of either audio or video or a combination of the two is increasingly popular.

The creation of multimedia content can be a time-consuming and complicated task. The creation of movies and other videos often involve the creation of many shorter video clips joined together to form a coherent narrative. This can be done on the fly, such as in live broadcasts (e.g., the nightly news broadcast or a live sporting events), or it can be done "off-line" through the use of editing.

In the more distant past, the editing of movies involved the physical cutting and splicing together of physical pieces of film. As technology became more sophisticated, editing moved to the world of computers, to the current standard, non-linear editing. In non-linear editing ("NLE"), various clips are "captured" (imported into a computer system) and brought into the NLE software and is edited using a variety of techniques. Using an NLE, an "editor" (the person in charge of editing the movie) is able to manipulate the start and end point of each clip, apply transitions, add titles, and manage different audio and video tracks, and the like in order to create a finished product. Exemplary NLE video systems include Adobe Premiere™, Apple Final Cut Pro™, Avid Media Composer™, Sony Vegas™, and Windows Movie Maker™ Exemplary audio editing systems include Ableton Live™, Adobe Audition™ Garageband™, and Pro Tools™.

While the use of NLE software has made it easier for a user to edit video and other multimedia clips, the process can still be time consuming and difficult. To create a video, an editor might need to view every clip that was shot, select the best "take" to use in the final video, trim the take to the proper length, add titles, and edit/add appropriate audio to accompany the video. Although the above described situation specifically refers to video production, it should be understood that many of the same situations also occur when editing audio-only files.

Accordingly, it would be beneficial to provide an automated approach in which videos and/or other multimedia clips can be choreographed and edited.

SUMMARY

Embodiments are directed to a computer implemented method of choreographic editing of multimedia files. The method includes receiving one or more multimedia clips. The method further includes causing display of the one or more multimedia clips to a user. The method further includes receiving a selection of a subset of the one or more multimedia clips. The method further includes receiving a plurality of synchronization points from the user. The method further includes adjusting the subset of the one or more multimedia clips using the plurality of synchronization points. The method further includes creating a finished media file comprising the subset of the one or more multimedia clips.

Embodiments are further directed to a computer system for choreographic editing of multimedia files. The system includes a memory and a processor system communicatively coupled to the memory. The processor is configured to perform a method that includes receiving one or more multimedia clips; causing display of the one or more multimedia clips to a user; receiving a selection of a subset of the one or more multimedia clips; receiving a plurality of synchronization points from the user; adjusting the subset of the one or more multimedia clips using the plurality of synchronization points; and creating a finished media file comprising the subset of the one or more multimedia clips.

Embodiments are further directed to a computer program product for choreographic editing of multimedia files. The computer program product includes a computer-readable storage medium having program instructions embodied therewith, wherein the computer-readable storage medium is not a transitory signal per se. The program instructions are readable by a processor system to cause the processor system to perform a method that includes receiving one or more multimedia clips; causing display of the one or more multimedia clips to a user; receiving a selection of a subset of the one or more multimedia clips; receiving a plurality of synchronization points from the user; adjusting the subset of the one or more multimedia clips using the plurality of synchronization points; and creating a finished media file comprising the subset of the one or more multimedia clips.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

In the accompanying figures and following detailed description of the disclosed embodiments, the various elements illustrated in the figures are provided with three digit reference numbers. The leftmost digits of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. Various connections might be set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, although this disclosure includes a detailed description of a computing device configuration, implementation of the teachings recited herein are not limited to a particular type or configuration of computing device(s). Rather, embodiments of the present disclosure are capable of being implemented in conjunction with any other type or configuration of wireless or non-wireless computing devices and/or computing environments, now known or later developed.

Furthermore, although this disclosure includes a detailed description of choreographic editing of multimedia and other streams, implementation of the teachings recited herein are not limited to embodiments described herein. Rather, embodiments of the present disclosure are capable of being implemented in conjunction with any other type of multimedia editing system, now known or later developed.

At least the features and combinations of features described in the immediately present application, including the corresponding features and combinations of features depicted in the figures amount to significantly more than implementing a method of choreographing multimedia files in a particular technological environment. Additionally, at least the features and combinations of features described in the immediately preceding paragraphs, including the corresponding features and combinations of features depicted in the figures go beyond what is well-understood, routine and conventional in the relevant field(s).

Turning now to some brief definitions of terms, a "multimedia file" refers to a digital file that contains video information and/or audio information in one of a variety of different file formats. It should be understood that while certain aspects of embodiments are discussed in conjunction with video files, many aspects can also apply to files that contain only audio information. A "frame" is an electronically coded still image used in video technology. When the images are displayed at various "frame rates," the result is a moving image. A variety of different frame rates can be used in today's video formats. Common frame rates include 24 frames per second, 25 frames per second, 30 frames per second, 48 frames per second, 60 frames per second, and other frame rates that are typically multiples of the above described frame rates.

A "track" is a portion of a recording that will be joined together with other tracks to form a full multimedia file. For example, in a musical work, a track might be one particular instrument. Thus, a song might comprise multiple tracks: a bass guitar might be recorded onto one track, drums might be recorded onto one or more additional tracks, an electric guitar might be recorded to yet another track, and lead vocals might be recorded into yet another track. In addition, each "take" of a performance can be recorded onto a separate track. The finalized song can contain multiple tracks (each individual instrument on a track as described above) and multiple takes (take one of the first portion of the guitar solo and take two of the second portion of the guitar solo).

Tracks are also used in video editing. A finalized video file is often created from multiple multimedia files, each comprising one or more tracks. A video file might contain music on one track, a voice-over on a second track, a primary video source on a third track, and a secondary video source on a fourth track, and so forth. It should be understood that both video and audio productions often have many different tracks.

A clip is a segment of a video or multimedia file that contains video, audio, graphics, or other contents. A clip is often a segment of a video within a larger video file. The terms track and clip might be used synonymously in some contexts. In other contexts, the term "clip" refers to an individual segment while a track might refer to multiple segments, each of which have similar content (e.g., content from a particular camera angle).

The job of an editor might include a number of steps: 1) identifying clips of the source material to use in a final file; 2) compiling these clips into a production; and 3) editing the clips of the production to achieve the desired synchronization of the various tracks. In particular, the synchronization of tracks can be quite tedious, often working at fine levels of detail (such as individual video frames) to cut, join, and stretch the content so that it synchronizes.

Figure 1:
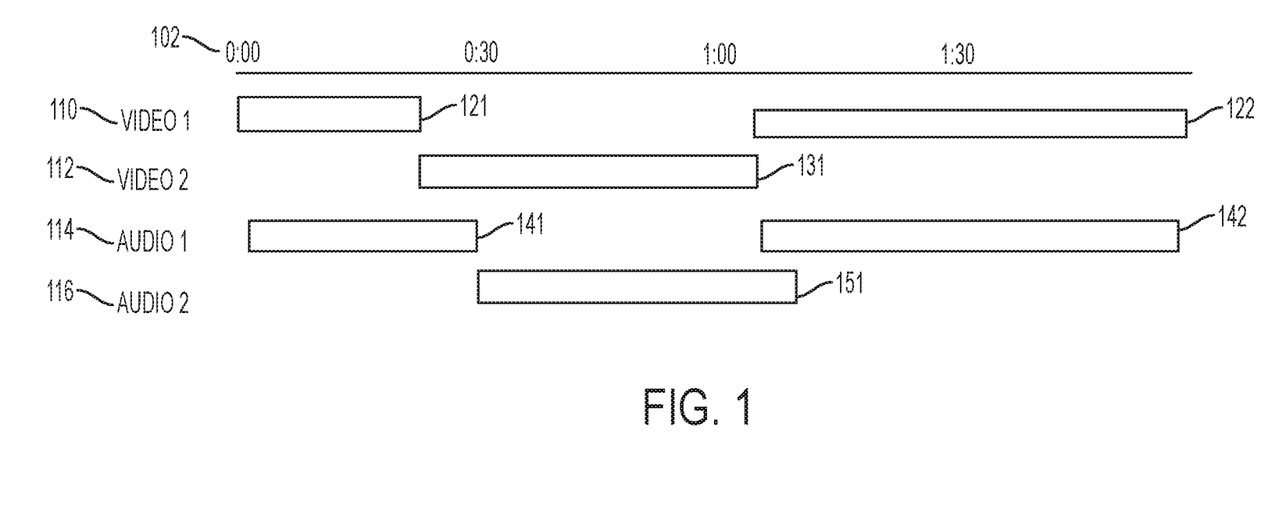
FIG. 1 depicts a timeline of a typical non-linear editing system.

A difficulty of using video editing systems (such as an NLE) of the prior art is that it can be time consuming and tedious to create and edit a finalized video file. With reference to FIG. 1, let us examine an exemplary, relatively simple video production—a sit down interview featuring a host and a guest. FIG. 1 depicts a timeline 100 of an exemplary NLE video editing system. Timeline 100 includes a timer 102 that indicates the time of the video production and additional areas for the placement of tracks. Even for such a relatively simple production, there would typically be at least four tracks (where each track might have one or more clips): a first video track 110 with the camera focused on the guest, a second video 112 track with the camera focused on the host, a first audio track 114 with the guest's microphone output, and a second audio track 116 with the host's microphone output. As a video production becomes more sophisticated, more and more tracks might be added to the production. For example, to the above-described production, the following tracks can be added (not shown in FIG. 1): a third video track to illustrate a first point made during the interview (such as historical footage of the interview subject), a fourth video track to illustrate a second point made during the interview (such as "b-roll" footage of the interview subject), a third audio track containing a voice-over, a fourth audio track containing background music, and so on. There might also be additional tracks containing text and graphics, such as closed captioning, titles, explanatory text, logos, and the like. Within each track can be one or more clips selected from the track. For example, track 110 includes clips 121 and 122, track 112 includes clip 131, track 114 includes clip 141 and 142, and track 116 includes clip 151.

When a finalized video file is being created from the individual tracks 110, 112, 114, and 116, the audio tracks and the video tracks are placed on timeline 100. An editor can switch between the video tracks (e.g., showing the first video track when the guest is answering the question, showing the second video track when the host is asking the question, cutting between the first and second video tracks to show reactions to the questions and answers, and the like) and switch between the audio tracks. The editor can add transitions (e.g., cuts, dissolves, wipes, and the like) between tracks, add special effects (e.g., fade-in, fade-out), adjust color, adjust timing, adjust speed, adjust volume, and many other tasks that are now known in the art or developed in the future. In addition, many modern video productions use a style that involves quick cuts between different tracks, which adds to the complexity of creating a finalized video file because many more cuts, inserts, and the likes will have to be added and synchronized.

The existing work process can become time-consuming. Each switch between tracks has to be selected. Each track has to be of the correct length such that undesirable overlaps are avoided, the timing of each track has to be adjusted, meaning that either the length of the track and/or the playback speed of the track has to be adjusted. Each of these tasks (and more that are not described herein) creates a considerable drag on the amount of content that can be produced. The result is that it can be cost and time prohibitive to create and revise video content with high production values.

Figure 2:
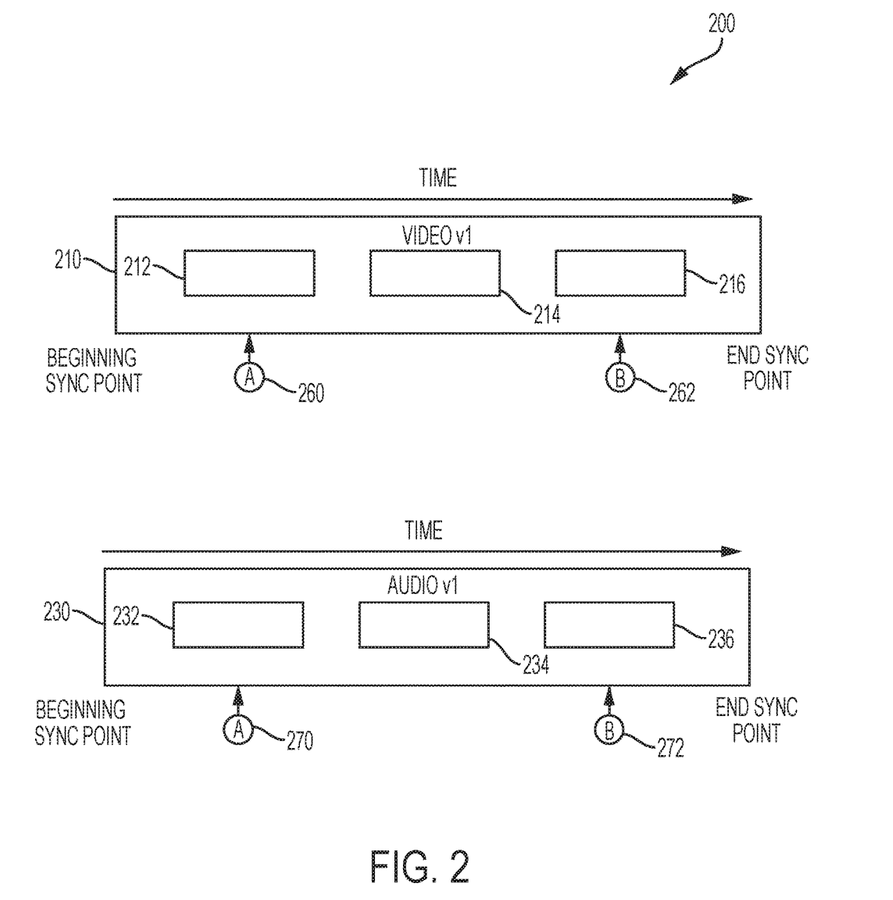
FIG. 2 depicts a timeline according to one or more embodiments prior to synchronization.
Figure 3:
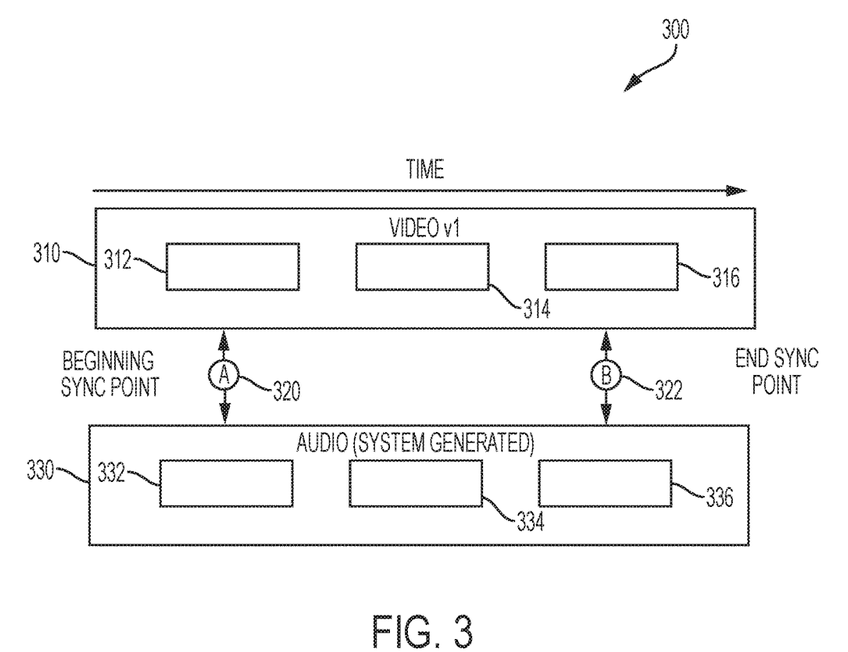
FIG. 3 depicts a timeline according to one or more embodiments following synchronization.

With reference to FIGS. 2 and 3, one aspect of some embodiments is the usage of "synchronization points," also known as "sync points." Synchronization points indicate where content should be aligned. In this system, a clip has at least two synchronization points. Typically, the synchronization points are placed at the beginning of the clip and another at the end of a clip. Synchronization points may also be manually defined by the user such that they are located elsewhere on each clip. For example, an editor can set synchronization points by simply placing the video editing cursor at the desired location and creating a synchronization point. In some cases, synchronization points can be automatically created or inferred: for example, it could be useful to scan a voice-over track to detect start/stop points in order to create synchronization points for the narrative.

With reference to FIG. 2, timeline 200 illustrates the operation of an embodiment before synchronization has occurred. Timeline 200 comprises two tracks, video track 210 and audio track 230. Video track 210 can comprise multiple clips 212, 214, and 216. Similarly, audio track 230 can comprise multiple clips 232, 234, and 236. An editor might be interested in joining video track 210 with audio track 230. In existing NLE software solutions, an editor interested in joining the tracks would have to do a lot of work to make sure video track 210 synchronized properly with audio track 230. As mentioned above, the editor would have to ensure that the beginning points of both video track 210 and audio track 230 matched, that the lengths of both video track 210 and audio track 230 matched, and that the end points of both video track 210 and audio track 230 matched. If the lengths did not match, the editor would have to trim one or both tracks and/or adjust the playback speed of one or both tracks.

Under an embodiment of the present disclosure, the editor places a synchronization point 260 and a synchronization point 262 on video track 210. The editor also places a synchronization point 270 and a synchronization point 272 on audio track 230. An embodiment performs the synchronization of the clips automatically, aligning synchronization point 260 with synchronization point 270 and aligning synchronization point 262 with synchronization point 272. The result, after the synchronization is performed, is presented in FIG. 3.

In FIG. 3, timeline 300 comprises two tracks, video track 310 and audio track 330. Video track 310 can comprise multiple clips 312, 314, and 316. Similarly, audio track 330 can comprise multiple clips 332, 334, and 336. It should be understood that video track 310 corresponds to video track 210 of FIG. 2. Similarly, audio track 330 corresponds to audio track 230 of FIG. 2.

What FIG. 3 shows is that there are now joint synchronization points 320 and 322. Synchronization point 320 is the alignment of synchronization point 260 and synchronization point 270. Synchronization point 322 is the alignment of synchronization point 262 and synchronization point 272. An embodiment automatically analyzes the content of video track 210 and audio track 230 and choreographs the content such that synchronization point 260 aligns with synchronization point 270 and that synchronization point 262 aligns with synchronization point 272. The content of each clip within video track 210 and audio track 230 is automatically and intelligently adjusted to maintain the timing and synchronization of the content. It should be understood that additional synchronization points can be used to further refine the timing, enabling very precise choreography with relatively little effort.

One or more embodiments provide systems and methodologies that allow an editor to identify the relevant portions of each track of the source material the editor would like to use in the production. This can be in the form of preview windows, transport controls, scrubbing tools and the like, as is known in the art or will be developed in the future. Such preview windows, transport controls, and scrubbing tools allow an editor to view tracks, determine which tracks to use, place one or more synchronization points, and the like. Such tools can also provide the editor the ability to perform manual edits. While embodiments allow an editor the freedom of having such tasks be performed automatically without input from an editor, some editors might like the ability to manually edit tracks in some situations.

Synchronization points can be placed anywhere on the track. While FIGS. 2 and 3 illustrate synchronization points in the middle of the respective video and audio tracks, synchronization points also can be placed at the beginning or end of a track.

The effect of a synchronization point is that an embodiment will automatically choreograph second clips, third clips, and additional clips on the basis of synchronization points placed on a first clip. Returning to the interview example discussed above, an editor might place synchronization points on the track containing footage of the interview subject. The editor is then able to add other tracks (e.g., the track containing footage of the interviewer, insert footage, voice-over footage, and the like). As tracks are added, they are automatically cut to fit within the synchronization points.

Figure 4:
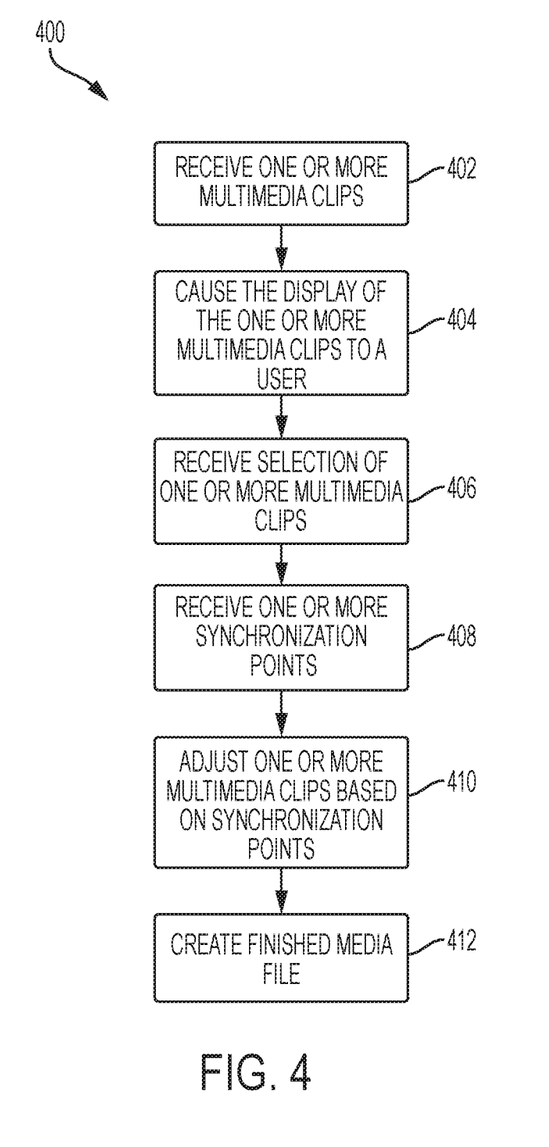
FIG. 4 depicts a flow diagram illustrating the operation of an embodiment.
Figure 5:
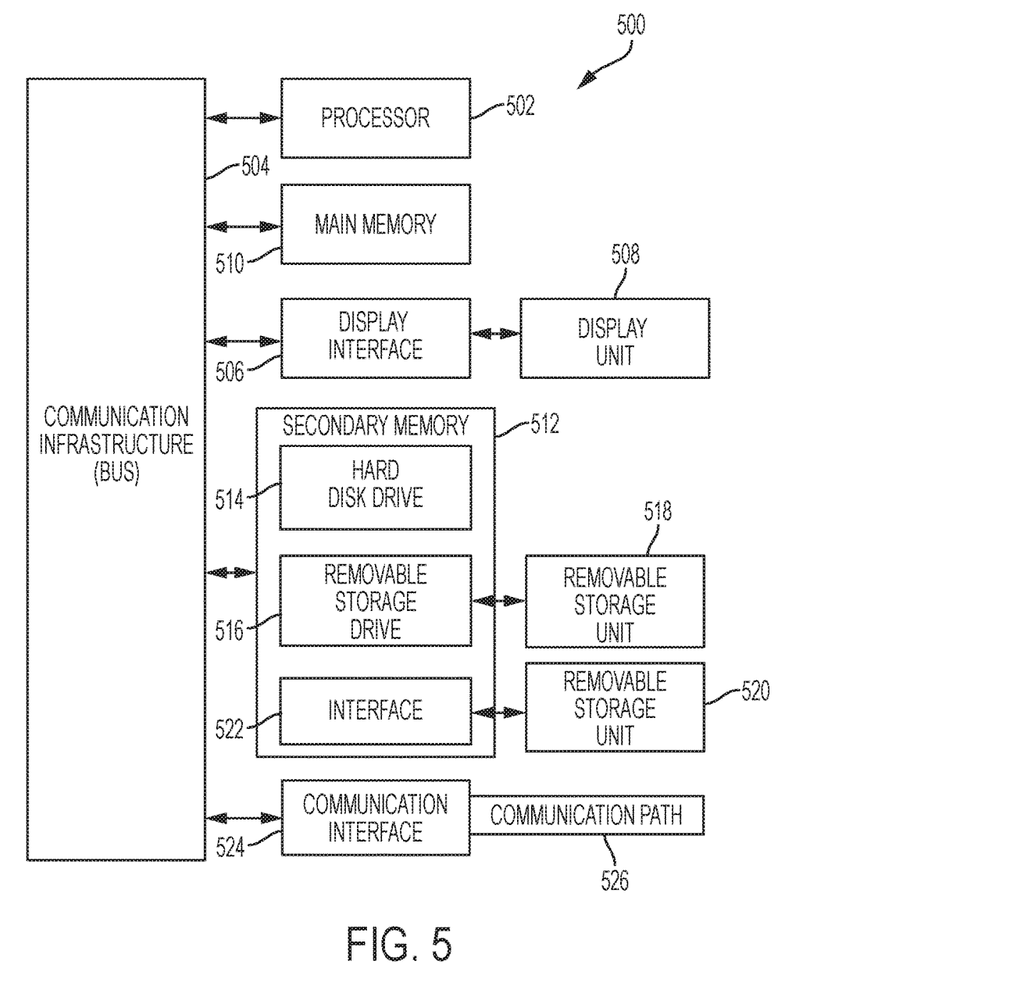
FIG. 5 depicts a computer system capable of implementing hardware components of one or more embodiments.

A flowchart illustrating a method 400 of implementing a choreographic editing system is presented in FIG. 4. Method 400 is merely exemplary and is not limited to the embodiments presented herein. Method 400 can be employed in many different embodiments or examples not specifically depicted or described herein. In some embodiments, the procedures, processes, and/or activities of method 400 can be performed in the order presented. In other embodiments, one or more of the procedures, processes, and/or activities of method 400 can be combined or skipped. In some embodiments, portions of method 400 can be implemented by computer system 500 (FIG. 5).

An editor loads one or more multimedia clips into a system capable of operating an embodiment (block 402). This process is also known as "ingesting" the clips into the system. This can involve connecting a memory source (such as a camera or a secure digital card (SD card)) to the computer system. This can further involve loading other clips from other sources (such as music files, voiceover files, stock footage, and the like). The clips are stored in a memory, such as secondary memory 512 of FIG. 5.

The editor is then able to view clips and browse through clips (block 404). This is done using a variety of methods, both those currently existing and those developed in the future. Typically, this involves an editor using transport controls (either physical or virtual) to navigate through clips, while viewing the clips through a preview window. From the perspective of the system, a list of clips is displayed to the user. Navigation controls are also displayed to the user. Navigation controls allow the user to view and browse clips. The navigation controls allow a user to make navigation inputs, such as the ability to view clips forwards and backwards and at different speeds. The navigation controls may also allow a user to mark clips, such as allowing notations or tagging of the clips.

The editor selects clips to use in a video project (block 406). This can be a subset of the clips loaded at block 402. It should be understood that a subset can include the entire set. This can be accomplished in one of a variety of different manners. In some embodiments, the editor can drag the clip onto a timeline. The editor then places synchronization points in the project (block 408). The synchronization points may be placed as described above. For example, a first synchronization point is selected for a first clip. A corresponding first synchronization point is selected for a second clip. A second synchronization point is selected for the first clip. A corresponding second synchronization point is selected for the second clip.

An embodiment is then able to automatically and intelligently adjust the one or more selected clips on the timeline to maintain the timing and synchronization of the content (block 410). Continuing the example given above, the first clip and the second clip are synchronized based on the first and second synchronization points on the first clip and the corresponding first and second synchronization points on the second clip. The synchronization point on the first clip can be aligned with the corresponding synchronization point on the second clip. In other words, the synchronization points on different clips can be adjusted to ensure that corresponding synchronization points start and/or end at the same time. Beginning and end points of each clip (or the earliest synchronization points of each clip) can be automatically aligned and the content of each clip is automatically and intelligently adjusted to maintain the timing and synchronization of the content. Within these clips, additional synchronization points can be used to further refine the timing of the clips, enabling precise choreography with comparatively little effort.

The system begins by analyzing both the first and second clips and the synchronization points to identify one or more places in which content can be stretched or compressed in a manner that can respect and enforce the synchronization points. Depending on the embodiments, there are numerous strategies that can be employed by the system in order to identify which synchronization points should be aligned.

In some cases, the system might try to automatically align synchronization points based on their proximity. This can be performed using heuristics and/or thresholds to intelligently determine the properties of the alignment. This might be appropriate for home-movies where it would simplify usability.

In other situations, a system performing an embodiment might provide mechanisms by which the user can indicate where synchronization points should be aligned. It might do this by having different types of synchronization points, or it might provide the user with ways to indicate which synchronization points should be aligned.

Having identified related synchronization points, the system can then proceed with aligning content. This can involve calculating the amount of time which must be removed or added from one segment of content in order to align with another segment. Content can then be intelligently removed, duplicated, expanded, or compressed as necessary. Heuristics can be employed such that if the system infers that only a relatively small amount of stretching or compressing is required, it can choose an optimal algorithm that best preserves the content. Conversely, if the system infers that a relatively large amount of time must be added or removed from, it can use different algorithms or even resort to breaking up the content into smaller clips in order to realize the editorial goal of enforcing the user's synchronization points.

These heuristics might vary according to the content. For content that contains video, content can be slightly expanded or compressed by duplicating or removing frames, respectively. By doing this over the span of the content segment, the timing can be adjusted with minimal impact to the content's playback. In other cases, the system might manipulate the frame rate or playback speed of the content in order to effect the desired compression or expansion, without a noticeable visual effect. In some embodiments, this could include compensation to avoid resulting in an inadvertent slow-motion or fast-forwarding effect.

For audio-only content, these same strategies can be applied. However, their implementations may differ because the content is manipulated in terms of samples rather than frames.

Once the algorithms and heuristics are applied, a finished media file is generated (block 412). From here, the finished media file can be used in a variety of different manners. For example, the finished media file can be uploaded to a video sharing service (such as Youtube), burned to an optical disc (such as a DVD or Blu-ray disc, copied to a memory card, or broadcast via cable TV, or via satellite, or via radio waves.

One benefit of this approach is that it is easier for an editor to use. By focusing on the content they wish to use, the editor can work on a more semantic level directly tied to their desired results. With this approach, editing is more focused on the higher level goals of sequencing and pacing while the content is automatically choreographed to fit those editorial goals. As such, the editor is focused more on the creative side of their work, while the mechanical side of existing situations (e.g., aligning and syncing clips) is greatly reduced.

There are additional real-world benefits from various embodiments. In some video productions, there might be a desire to frequently revisit and revise content. Embodiments of the present disclosure allow an editor to update productions when source material changes in a much easier manner. There are many different instances in which such a capability can be used. For example, a video that is intended to be used to demonstrate a product (for display on a website or at a conference) could be easily updated as the product evolves—new clips from updated video footage could be easily choreographed with the existing narrative merely by placing synchronization points at the appropriate section of the new footage. To put the example into more concrete terms, imagine a video showing features of a new smartphone. Portions of the video might be created during a developmental cycle, while features are being frequently revised. There might be an entire section of the demonstration video dedicated to the camera. As the camera and its accompanying software is improved upon during the developmental cycle, the video portions showing that feature can be changed in a relatively easy manner by merely setting synchronization points at certain points of the section showing the operation of the camera, without necessarily requiring re-recording or re-syncing of an audio voice-over that describes those features.

As another example, broadcast journalism and live televised sports could benefit greatly from various embodiments, as new information can be utilized as it becomes available in a much easier manner. A sports broadcast discussing key plays of a basketball game can be mixed and matched with other key plays. Footage from the first quarter of the game can be easily re-purposed when the second quarter of the game has completed. A compilation of footage from all four quarters can be easily compiled once the entire game has completed. Ongoing news events such as election results, weather reports, and the like also can be added to in a much easier manner. Such new information can be added or changed without needing to change any other tracks because of the presence of the synchronization points.

Since the system maintains the overall timing of the clips, users are empowered to be more active in creating and maintaining their productions without having to deal with the details of the timing of each individual clip.

One key differentiator between the present approach and approaches of the prior art is that an editor using an embodiment can edit tracks and clips solely for their content, as opposed to being overly concerned about the length, speed, and other technical information about each track. An amateur editing a home movie understands what footage they wish to use, which portions of an audio track to use, and the like. However, using the prior art, despite all that knowledge, it can be tedious to compile such footage into a usable final product because of the need to deal with timing and alignment issues for every single clip used in the final product.

One further advantage of a system using an embodiment is that the synchronization points may be inherently part of the content within a given track or content source. As such, a synchronization point can act as a semantic "anchor" for significant points within that particular track. This makes synchronization points portable across all of the video productions which use that particular track. This allows a highlight of a particular basketball game in many different newscasts, simply inserting the basketball game footage with synchronization points into a different news broadcast, such as throughout each local station of a network.

In some embodiments, synchronization points may be automatically identified for certain types of content, such as breaking up a voice-over track into separate clips for each sentence in the narrative. As another example, synchronization points might be tagged in near real-time by a broadcast engineer working on a televised sporting event. After the event has been tagged, the synchronization points could then be easily incorporated by the director into the subsequent playback of the play during their live broadcast. Furthermore, having tagged the footage in this semantic way, the same play could be readily incorporated into other productions created later in the day such as game-day highlights, local newscasts, and the like.

Building on these synchronization points within content, a multimedia project as a whole can have its own synchronization points, separate from the synchronization points of each individual track. In fact, these synchronization points are just as semantic as the synchronization points of the underlying content clips, because these project-level synchronization points can serve two vital roles in the creative compilation of content: first, as an outline which sets forth the sequence of the content, and second, as a way of controlling the pacing and rhythm of the production.

In some embodiments of this invention, there might even be a natural hierarchy of synchronization points, ranging from the relatively fine-grained synchronization points specific to the raw content all the way up to the high-level synchronization points that organize and structure a given production. The result is that from the very beginning of a new project, the editor can begin their work on the creative level as opposed to the technical level.

Simply by collecting content into a production, the synchronization points provide the initial outline, which can be easily refined and organized into higher levels as-needed for their work. The result is that the editor is doing their work entirely in terms of the outline or storyboard which arises naturally as they manipulate the synchronization points within the project and its content.

There are additional features that also might be present in some embodiments. For example, relative offsets can be available. Tracks can be placed in an absolute position (e.g., 40 seconds from the beginning of the work as a whole). Tracks can also be placed in a relative position. A relative position means that the track can be placed based off of the timing of another track or multiple tracks. An editor might want background music to fade-in 5 seconds before the end of a first track and to continue playing through the beginning of a second track. In this case, the "relative offset" is the fact that that the background music fades in 5 seconds before the end of the first scene. As the first scene changes during the editing process, the timing of the background music can remain the same. A relative offset can be based on the end or the beginning of a track. Instead of having the timing of the background music being dependent on an absolute time, it is dependent relative to the timing of another track.

Another additional feature is the presence of content-specific policies. Specific tracks can have special rules that are specific to that track. For example, the ability to manipulate frame and audio rates, whether to expand or compress content and how it should be done, and the like can be limited on a track-by-track basis. An editor might decide that a first track is limited to a certain amount of expansion/compression, while a second track has more expansion/compression available.

Building upon the content-specific policies, the concept of sacrosanct content adds the ability to completely disable expansion and compression of a specific track. For example, an editor might want to mark a musical track as sacrosanct such that the playback speed of the musical track remains unchanged for pitch-related reasons—in this manner, an automated system containing an embodiment can be prevented from making changes related to playback speed of a certain track. It should be understood that the terms expansion and compression as used herein do not refer to data compression (reducing the number of bytes of a segment by encoding information) but instead refers to the compression or expansion of time used for a clip. For example, a clip that is 30 seconds long can be "compressed" such that it takes up 29 seconds worth of time or "expanded" such that it takes up 31 seconds of time.

FIG. 5 depicts a high level block diagram computer system 500, which may be used to implement one or more embodiments of the present disclosure. More specifically, computer system 500 may be used to implement hardware components of systems capable of performing methods described herein. Although one exemplary computer system 500 is shown, computer system 500 includes a communication path 526, which connects computer system 500 to additional systems (not depicted) and may include one or more wide area networks (WANs) and/or local area networks (LANs) such as the Internet, intranet(s), and/or wireless communication network(s). Computer system 500 and additional system are in communication via communication path 526, e.g., to communicate data between them.

Computer system 500 includes one or more processors, such as processor 502. Processor 502 is connected to a communication infrastructure 504 (e.g., a communications bus, cross-over bar, or network). Computer system 500 can include a display interface 506 that forwards graphics, textual content, and other data from communication infrastructure 504 (or from a frame buffer not shown) for display on a display unit 508. Computer system 500 also includes a main memory 510, preferably random access memory (RAM), and may also include a secondary memory 512. Secondary memory 512 may include, for example, a hard disk drive 514 and/or a removable storage drive 516, representing, for example, a floppy disk drive, a magnetic tape drive, or an optical disc drive. Hard disk drive 514 can be in the form of a solid state drive (SSD), a traditional magnetic disk drive, or a hybrid of the two. There also may be more than one hard disk drive 514 contained within secondary memory 512. Removable storage drive 516 reads from and/or writes to a removable storage unit 518 in a manner well known to those having ordinary skill in the art. Removable storage unit 518 represents, for example, a floppy disk, a compact disc, a magnetic tape, or an optical disc, etc. which is read by and written to by removable storage drive 516. As will be appreciated, removable storage unit 518 includes a computer-readable medium having stored therein computer software and/or data.

In alternative embodiments, secondary memory 512 may include other similar means for allowing computer programs or other instructions to be loaded into the computer system. Such means may include, for example, a removable storage unit 520 and an interface 522. Examples of such means may include a program package and package interface (such as that found in video game devices), a removable memory chip (such as an EPROM, secure digital card (SD card), compact flash card (CF card), universal serial bus (USB) memory, or PROM) and associated socket, and other removable storage units 520 and interfaces 522 which allow software and data to be transferred from the removable storage unit 520 to computer system 500.

Computer system 500 may also include a communications interface 524. Communications interface 524 allows software and data to be transferred between the computer system and external devices. Examples of communications interface 524 may include a modem, a network interface (such as an Ethernet card), a communications port, or a PC card slot and card, a universal serial bus port (USB), and the like. Software and data transferred via communications interface 524 are in the form of signals which may be, for example, electronic, electromagnetic, optical, or other signals capable of being received by communications interface 524. These signals are provided to communications interface 524 via communication path (i.e., channel) 526. Communication path 526 carries signals and may be implemented using wire or cable, fiber optics, a phone line, a cellular phone link, an RF link, and/or other communications channels.

In the present disclosure, the terms "computer program medium," "computer usable medium," and "computer-readable medium" are used to generally refer to media such as main memory 510 and secondary memory 512, removable storage drive 516, and a hard disk installed in hard disk drive 514. Computer programs (also called computer control logic) are stored in main memory 510 and/or secondary memory 512. Computer programs may also be received via communications interface 524. Such computer programs, when run, enable the computer system to perform the features of the present disclosure as discussed herein. In particular, the computer programs, when run, enable processor 502 to perform the features of the computer system. Accordingly, such computer programs represent controllers of the computer system. Thus it can be seen from the forgoing detailed description that one or more embodiments of the present disclosure provide technical benefits and advantages.

Figure 6:
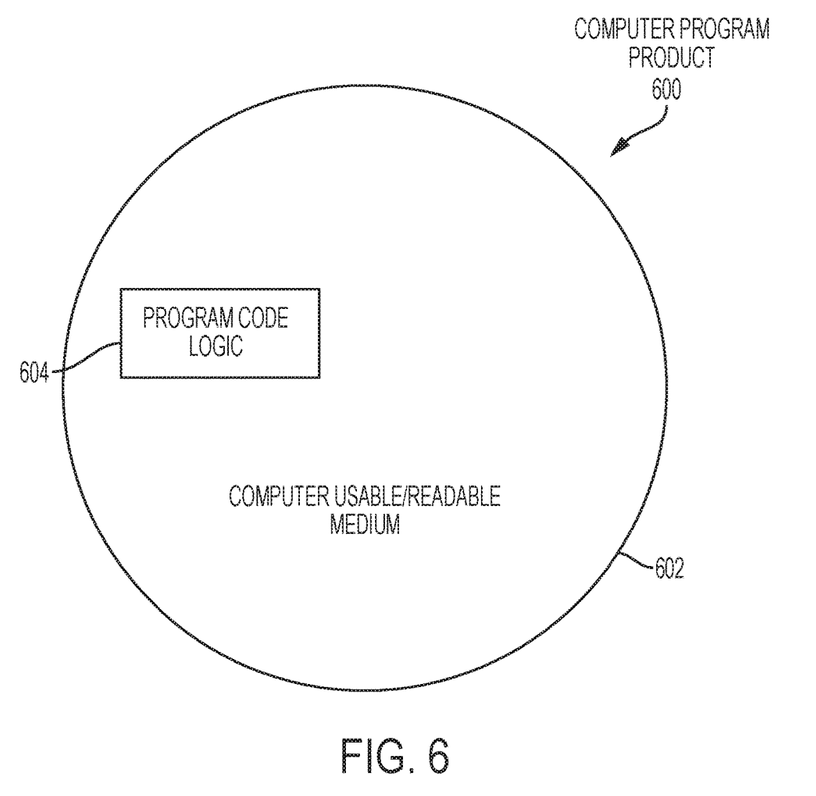
FIG. 6 depicts a diagram of a computer program product according to one or more embodiments.

Referring now to FIG. 6, a computer program product 600 in accordance with an embodiment that includes a computer-readable storage medium 602 and program instructions 604 is generally shown.

The present disclosure may be a system, a method, and/or a computer program product. The computer program product may include a computer-readable storage medium (or media) having computer-readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may include assembler instructions, instruction-set-architecture (ISA) instructions, machine instructions, machine dependent instructions, microcode, firmware instructions, state-setting data, or either source code or object code written in any combination of one or more programming languages, including an objectoriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method comprising:
receiving one or more multimedia clips;
causing display of the one or more multimedia clips to a user;
receiving a selection of a subset of the one or more multimedia clips;
receiving a plurality of synchronization points from the user; and
automatically adjusting the subset of the one or more multimedia clips using the plurality of synchronization points to create a finished media file, wherein the synchronization points include a hierarchy of synchronization points ranging from point specific synchronization points to high-level synchronization points;
wherein automatically adjusting the subset of the one or more multimedia clips using the plurality of synchronization points to create the finished media file comprises:
automatically adjusting a timing and an alignment of the first multimedia clip and second multimedia clip such that the first synchronization point of the first multimedia clip aligns with the corresponding first synchronization point and the second synchronization point of the first multimedia clip aligns with the corresponding second synchronization point of the second multimedia clip; wherein
automatically adjusting the timing and alignment comprises:

analyzing the first multimedia clip, the first synchronization point, and the second synchronization point;

analyzing the second multimedia clip, the corresponding first synchronization point, and the corresponding second synchronization point; and in order to maintain the timing and synchronization of the first multimedia clip with the second multimedia clip based on the plurality of synchronization points:

determining one or more places of the first multimedia clip in which a content of the first multimedia clip can be removed, duplicated, stretched, or compressed;

determining one or more places of the second multimedia clip in which a content of the second multimedia clip can be removed, duplicated, stretched, or compressed; and automatically applying the determined stretching or compressing of the first and second multimedia clips to create the finished media file.

2. The computer implemented method of claim 1 wherein:
receiving the one or more multimedia clips comprises ingesting the one or more multimedia clips from a memory source.

3. The computer implemented method of claim 1, wherein:
causing the display of the one or more multimedia clips comprises:
causing the display of a preview window configured to allow playback of the one or more multimedia clip; and
accepting navigation inputs from the user.

4. The computer implemented method of claim 1 wherein:
receiving a plurality of synchronization points from the user comprises:
receiving a first synchronization point for a first multimedia clip;
receiving a corresponding first synchronization point for a second multimedia clip;
receiving a second synchronization point for the first multimedia clip; and
receiving a corresponding second synchronization point for the second multimedia clip.

5. The computer implemented method of claim 1 wherein:
receiving a plurality of synchronization points from the user further comprises receiving content-specific policy for a chosen multimedia clip, wherein the content-specific policy comprises a limit as to an amount of expansion or compression available for the chosen multimedia clip.

6. The computer implemented method of claim 1 wherein:
receiving a plurality of synchronization points from the user further comprises receiving a relative offset synchronization point wherein the relative offset synchronization point allows a beginning of a first multimedia clip to be placed based off of an end of a second multimedia clip.

7. The computer implemented method of claim 1, further comprising:
receiving a content-specific policy for at least one of the one or more multimedia clips; wherein the content-specific policy restricts the ability to remove, duplicate, stretch, or compress the multimedia clip.

8. A computer system comprising:
a memory; and
a processor system communicatively coupled to the memory;
the processor system configured to perform a method comprising:
receiving one or more multimedia clips;

causing display of the one or more multimedia clips to a user;

receiving a selection of a subset of the one or more multimedia clips;

receiving a plurality of synchronization points from the user; and automatically adjusting the subset of the one or more multimedia clips using the plurality of synchronization points to create a finished media file, wherein the synchronization points include a hierarchy of synchronization points ranging from point specific synchronization points to high-level synchronization points;

wherein automatically adjusting the subset of the one or more multimedia clips using the plurality of synchronization points to create the finished media file comprises:

automatically adjusting a timing and an alignment of the first multimedia clip and second multimedia clip such that the first synchronization point of the first multimedia clip aligns with the corresponding first synchronization point and the second synchronization point of the first multimedia clip aligns with the corresponding second synchronization point of the second multimedia clip; wherein automatically adjusting the timing and alignment comprises:

analyzing the first multimedia clip, the first synchronization point, and the second synchronization point;

analyzing the second multimedia clip, the corresponding first synchronization point, and the corresponding second synchronization point; and in order to maintain the timing and synchronization of the first multimedia clip with the second multimedia clip based on the plurality of synchronization points:

determining one or more places of the first multimedia clip in which a content of the first multimedia clip can be removed, duplicated, stretched, or compressed;

determining one or more places of the second multimedia clip in which a content of the second multimedia clip can be removed, duplicated, stretched, or compressed; and automatically applying the determined stretching or compressing of the first and second multimedia clips to create the finished media file.

9. The computer system of claim 8 wherein:
receiving the one or more multimedia clips comprises ingesting the one or more multimedia clips from a memory source.

10. The computer system of claim 8 wherein:
causing the display of the one or more multimedia clips comprises:
causing the display of a preview window configured to allow playback of the one or more multimedia clip; and
accepting navigation inputs from the user.

11. The computer system of claim 8 wherein:
receiving a plurality of synchronization points from the user comprises:
receiving a first synchronization point for a first multimedia clip;
receiving a corresponding first synchronization point for a second multimedia clip;
receiving a second synchronization point for the first multimedia clip; and
receiving a corresponding second synchronization point for the second multimedia clip.

12. The computer system of claim 8 wherein:
receiving a plurality of synchronization points from the user further comprises receiving content-specific policy for a chosen multimedia clip, wherein the content-specific policy comprises a limit as to an amount of expansion or compression available for the chosen multimedia clip.

13. The computer system of claim 8 wherein:
receiving a plurality of synchronization points from the user further comprises receiving a relative offset synchronization point wherein the relative offset synchronization point allows a beginning of a first multimedia clip to be placed based off of an end of a second multimedia clip.

14. The computer system of claim 8, wherein the processor system is further configured to:
receive a content-specific policy for at least one of the one or more multimedia clips; wherein the content-specific policy restricts the ability to remove, duplicate, stretch, or compress the multimedia clip.

15. A computer program product comprising:
a computer-readable storage medium having program instructions embodied therewith, wherein the computer-readable storage medium is not a transitory signal per se, the program instructions readable by a processor system to cause the processor system to perform a method comprising:
receiving one or more multimedia clips;
causing display of the one or more multimedia clips to a user;
receiving a selection of a subset of the one or more multimedia clips;
receiving a plurality of synchronization points from the user; and
automatically adjusting the subset of the one or more multimedia clips using the plurality of synchronization points to create a finished media file, wherein the synchronization points include a hierarchy of synchronization points pattern ranging from point specific synchronization points to high-level synchronization points;
wherein automatically adjusting the subset of the one or more multimedia clips using the plurality of synchronization points to create the finished media file comprises:
automatically adjusting a timing and an alignment of the first multimedia clip and second multimedia clip such that the first synchronization point of the first multimedia clip aligns with the corresponding first synchronization point and the second synchronization point of the first multimedia clip aligns with the corresponding second synchronization point of the second multimedia clip; wherein adjusting the timing and alignment comprises:
analyzing the first multimedia clip, the first synchronization point, and the second synchronization point;
analyzing the second multimedia clip, the corresponding first synchronization point, and the corresponding second synchronization point; and
in order to maintain the timing and synchronization of the first multimedia clip with the second multimedia clip based on the plurality of synchronization points:
determining one or more places of the first multimedia clip in which a content of the first multimedia clip can be removed, duplicated, stretched, or compressed;
determining one or more places of the second multimedia clip in which a content of the second multimedia clip can be removed, duplicated, stretched, or compressed; and
applying the determined stretching or compressing of the first and second multimedia clips to create the finished media file.

16. The computer program product of claim 15 wherein:
causing the display of the one or more multimedia clips comprises:
causing the display of a preview window configured to allow playback of the one or more multimedia clip; and
accepting navigation inputs from the user.

17. The computer program product of claim 15 wherein:
receiving a plurality of synchronization points from the user comprises:
receiving a first synchronization point for a first multimedia clip;
receiving a corresponding first synchronization point for a second multimedia clip;
receiving a second synchronization point for the first multimedia clip; and
receiving a corresponding second synchronization point for the second multimedia clip.

18. The computer program product of claim 15 wherein:
receiving a plurality of synchronization points from the user further comprises receiving content-specific policy for a chosen multimedia clip, wherein the content-specific policy comprises a limit as to an amount of expansion or compression available for the chosen multimedia clip.

19. The computer program product of claim 15 wherein:
receiving a plurality of synchronization points from the user further comprises receiving a relative offset synchronization point wherein the relative offset synchronization point allows a beginning of a first multimedia clip to be placed based off of an end of a second multimedia clip.

20. The computer program product of claim 15, wherein the program instructions are further configured to:
receive a content-specific policy for at least one of the one or more multimedia clips; wherein the content-specific policy restricts the ability to remove, duplicate, stretch, or compress the multimedia clip.

* * * * *